(12) United States Patent
Matsuoka

(10) Patent No.: US 7,789,406 B2
(45) Date of Patent: Sep. 7, 2010

(54) SUSPENSION DEVICE AND METHOD FOR SUPPORTING WHEELS

(75) Inventor: Hisayoshi Matsuoka, Kanagawa (JP)

(73) Assignee: Nissan Motor Co. Ltd., Yokohama-shi, Kanagawa (JP)

( * ) Notice: Subject to any disclaimer, the term of this patent is extended or adjusted under 35 U.S.C. 154(b) by 361 days.

(21) Appl. No.: 12/058,959

(22) Filed: Mar. 31, 2008

(65) Prior Publication Data

US 2008/0246243 A1 Oct. 9, 2008

(30) Foreign Application Priority Data

Apr. 4, 2007 (JP) .............................. 2007-098528
Aug. 10, 2007 (JP) .............................. 2007-208897

(51) Int. Cl.
*B60G 3/04* (2006.01)
*B60G 3/26* (2006.01)

(52) U.S. Cl. ............................ 280/124.135; 280/5.523; 280/86.758; 280/124.144

(58) Field of Classification Search .............. 280/5.515, 280/5.516, 5.523, 5.524, 86.75, 86.758, 124.134, 280/124.135, 124.144, 124.145, 124.162; 267/140.11, 140.12, 140.5

See application file for complete search history.

(56) References Cited

U.S. PATENT DOCUMENTS

| 3,893,701 A | * | 7/1975 | Kroniger | ............. 280/124.131 |
| 4,681,342 A | | 7/1987 | Goeerich | |
| 4,772,043 A | | 9/1988 | Muramatsu | |
| 4,822,010 A | | 4/1989 | Thorn | |
| 5,340,146 A | * | 8/1994 | Kato | ................... 280/124.143 |
| 2010/0078911 A1 | * | 4/2010 | Kawabe et al. | ........ 280/124.144 |

FOREIGN PATENT DOCUMENTS

JP          62-234705          10/1987

\* cited by examiner

*Primary Examiner*—Eric Culbreth
*Assistant Examiner*—Joseph Rocca
(74) *Attorney, Agent, or Firm*—Young Basile

(57) ABSTRACT

A suspension device including two lower links that link a wheel supporting member and a vehicle-body side member to each other. The links are disposed substantially in parallel in a vehicle width direction. At least one projecting portion extends from at least one of the two links towards the other link. At least one elastic linking portion links the projecting portion of one of the links to at least one of the other link and the projecting portion of the other link. The at least one elastic linking portion has a rigidity that increases when a vibration input frequency increases to a value in a predetermined frequency band.

15 Claims, 9 Drawing Sheets

FORWARD IN VEHICLE
FORWARD-BACKWARD DIRECTION

US 7,789,406 B2

SUSPENSION DEVICE AND METHOD FOR SUPPORTING WHEELS

CROSS-REFERENCE TO RELATED APPLICATIONS

This application claims priority from Japanese Patent Application Serial No. 2007-098528, filed Apr. 4, 2007, and 2007-208897, filed Aug. 10, 2007, each of which is incorporated herein in its entirety by reference.

TECHNICAL FIELD

The present invention relates to a suspension device and method for supporting wheels used on a vehicle.

BACKGROUND

A related suspension device for rear wheels is discussed in, for example, Japanese Unexamined Patent Application Publication No. 62-234705. This device comprises a pair of rigid arms and a linking member. The pair of rigid arms links a vehicle-body side member and a lower area of a wheel supporting member, and the rigid arms are disposed apart from each other in a vehicle forward-backward direction. The linking member is provided between the pair of rigid arms and is rigidly linked to the pair of rigid arms.

The wheel supporting member and the vehicle-body side member are linked to the ends of the rigid arms by elastic bushes so as to be swingable, thereby allowing a vertical stroke.

BRIEF SUMMARY

The invention provides a suspension device and method for suspending wheels. According to one example of a suspension device taught herein, a wheel supporting member is configured to rotatably support a wheel, two links respectively link the wheel supporting member and a vehicle-body side member to each other and are disposed substantially in parallel in a vehicle width direction and at least one projecting portion extends from at least one of the two links towards the other link. In this example, an elastic linking portion links the projecting portion of one of the links to the other link and/or the projecting portion of the other link and is configured to increase its rigidity with an increasing frequency of a vibration input over a target frequency band.

According to another example of a suspension device for a wheel supporting member configured to rotatably support a wheel on a vehicle, the device comprises first linking means for linking the wheel supporting member and a vehicle-body side member and second linking means for linking the wheel supporting member and the vehicle-body side member. The second linking means is disposed behind the first linking means in a vehicle forward-backward direction. The device according to this example also includes relative displacement increasing means for increasing a relative displacement between the first linking means and the second linking means, reaction force generating means for generating a damping force in accordance with the relative displacement and reaction force adjusting means for increasing the damping force as a frequency of a periodic displacement included in the relative displacement increases.

One example of a method of suspending a wheel rotatably supported by a wheel supporting member taught herein comprises displacing two links relative to each other in accordance with a displacement of the wheel supporting member in a vehicle forward-backward direction, the two links linking the wheel supporting member and a vehicle-body side member to each other and disposed substantially in parallel in the vehicle width direction, generating a damping force in accordance with relative displacement and increasing the damping force as a frequency of a periodic displacement included in the relative displacement increases.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

When a vehicle travels, a frequency of an exciting force caused by, for example, an uneven road surface or a wheel imbalance can be transmitted to a suspension device. The suspension device, in turn, can transmit the exciting force to a vehicle body, causing the vehicle body to vibrate.

Embodiments of the suspension device taught herein can reduce vibration of the vehicle body.

Figure 1:
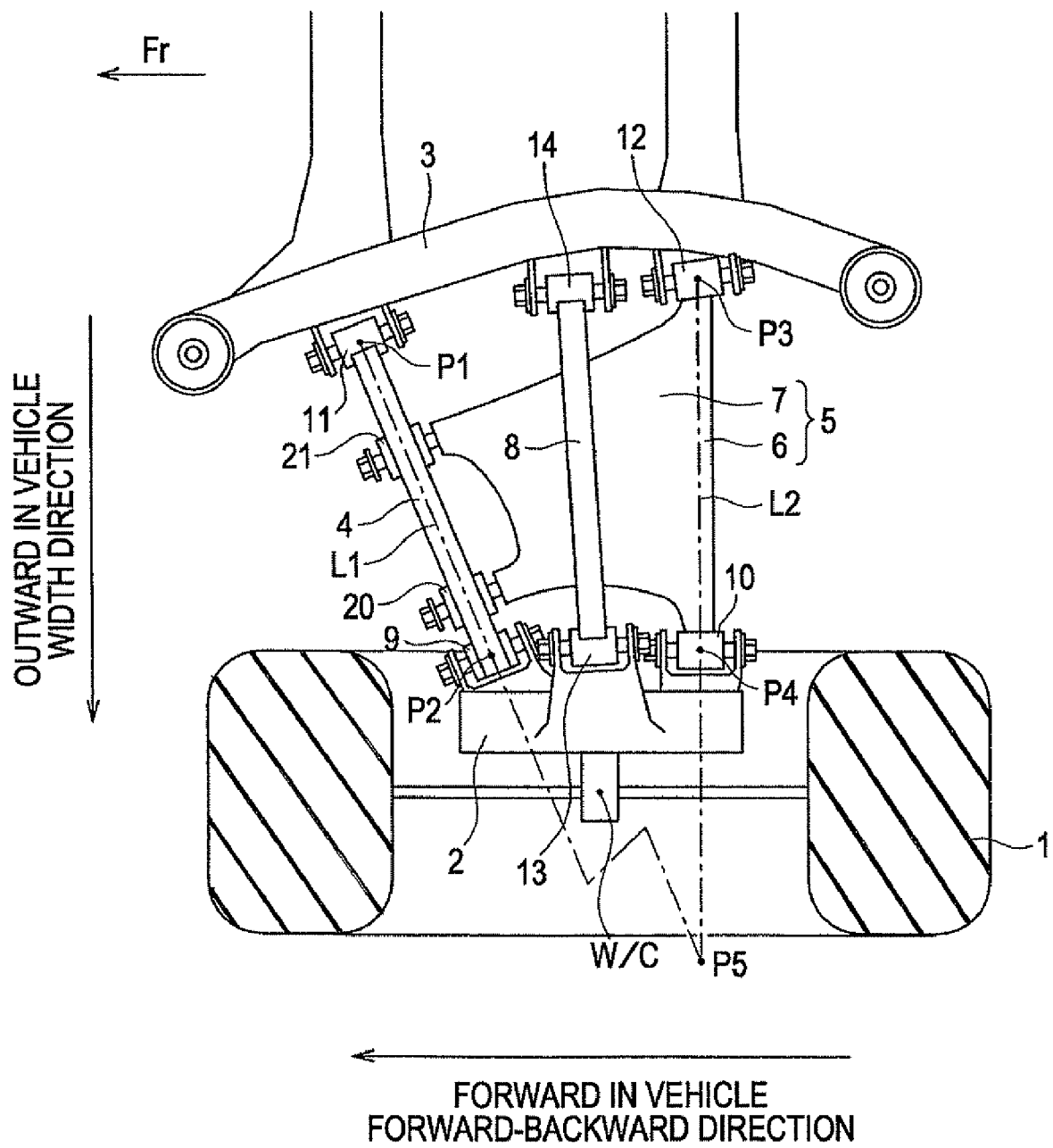
FIG. 1 is a top view of a suspension device for rear wheels according to an embodiment.
Figure 2:
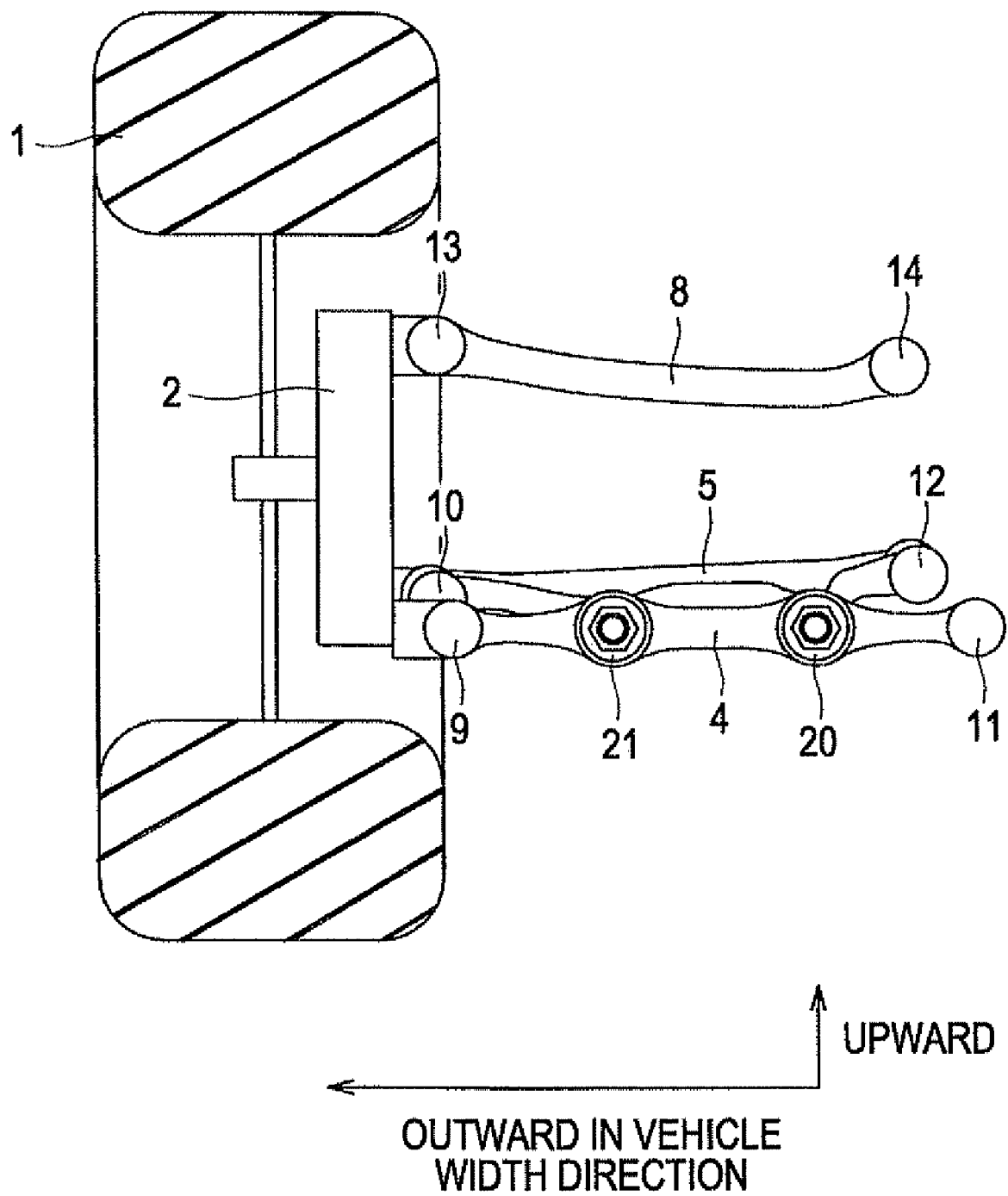
FIG. 2 is a schematic view, as seen from the front of a vehicle, of a disposition and structure of links in the suspension device for rear wheels according to the embodiment of FIG. 1.

FIG. 1 is a top view of a suspension device for rear wheels according to a first embodiment. FIG. 2 is a schematic view illustrating a disposition of links as seen from the front side of a vehicle.

The suspension device comprises two lower links 4 and 5 and an upper link 8. The lower links 4 and 5 link a lower area of an axle 2, which rotatably supports a wheel 1, and a suspension member 3, which is a vehicle-body side member. The upper link 8 links an upper area of the axle 2 and the suspension member 3.

The two lower links 4 and 5 are mounted to the axle 2 by one elastic bush 9 and one elastic bush 10, respectively, so that the lower links 4 and 5 are swingable vertically relative to the axle 2. The two lower links 4 and 5 are linked to the suspension member 3 through one elastic bush 11 and one elastic bush 12, respectively, so that the lower links 4 and 5 are swingable vertically relative to the suspension member 3. The upper link 8 is mounted to the axle 2 by one elastic bush 13 so as to be swingable vertically relative to the axle 2, and is linked to the suspension member 3 by one elastic bush 14 so as to be swingable vertically relative to the suspension member 3.

The two lower links 4 and 5 are disposed substantially in parallel in a vehicle width direction. Here, when the two lower links 4 and 5 are to be distinguished in the description, the lower link 4 at the front side in the vehicle forward-backward direction will be called the "front lower link 4," and the lower link 5 at the rear side in the vehicle forward-backward direction will be called the "rear lower link 5."

The elastic bushes 9 to 14 comprise elastic members, formed of rubber, inserted between outer cylinders and respective inner cylinders, and disposed in a nested state. In the embodiment, the outer cylinder sides are secured to ends of the links 4, 5 and 8, and the inner cylinder sides are mounted to the suspension member 3 or the axle 2 through bolts.

The front lower link 4 is a rod member extending linearly along a link axial line L1, and the elastic bushes 9 and 11 are provided at mounting portions at the respective ends of the front lower link 4.

The rear lower link 5 comprises a link body 6 and a projecting portion 7. The link body 6 extends along a link axial line L2. The projecting portion 7 is integrated with the link body 6 and projects towards the front in the vehicle forward-backward direction, from the link body 6 towards the front lower link 4. In this embodiment, the projecting portion 7 is a plate member that has a substantially trapezoidal shape in top view. The projecting portion 7 need not be a plate member. It may have any structure as long as it projects from the link body 6 towards the front lower link 4.

An end of the projecting portion 7 is linked to the front lower link 4 through two elastic bushes 20 and 21 and disposed in an offset manner in a vehicle width direction. In the embodiment, the elastic bushes 20 and 21 are, in top view, disposed with the bush axes being oriented in substantially in the vehicle forward-backward direction (that is, in a direction perpendicular to the link axial line L1). The outer cylinders of the bushes 20 and 21 are secured to the front lower link 4, and the inner cylinders of the bushes 20 and 21 are secured to the projecting portion 7 through mounting bolts. Accordingly, the front lower link 4 and the rear lower link 5 are, by the elastic bushes 20 and 21 (which are linking portions), linked to each other so as to be swingable three-dimensionally. In addition, the swinging amounts thereof are restricted to certain amounts due to, for example, the span between the outer and inner cylinders and the rigidity of the elastic members.

In addition, in top view, the lower links 4 and 5 are disposed so that the span in the vehicle forward-backward direction between mounting points of the respective lower links 4 and 5 to the axle 2 (hereunder simply referred to as "wheel-side mounting points P2 and P4", respectively) is less than the span in the vehicle forward-backward direction between mounting points of the respective lower links 4 and 5 to the suspension member 3 (hereunder simply referred to as "vehicle-body side mounting points P1 and P3", respectively). That is, in top view, an intersection P5 of the axial line L1 (connecting the wheel-side mounting point P2 and the vehicle-body side mounting point P1 of the lower link 4) and the axial line L2 (connecting the wheel-side mounting point P4 and the vehicle-body side mounting point P3 of the lower link 5) is further outward than the axle 2 in the vehicle width direction, that is, further outward than the wheel-side mounting points P2 and P4 of the respective lower links 4 and 5 in the vehicle width direction. In the embodiment shown in FIG. 1, in top view, an offset amount of the wheel-side mounting point P2 towards the back in the vehicle forward-backward direction with respect to the vehicle-body side mounting point P1 in the front lower link 4 is larger than an offset amount (substantially zero in FIG. 1) of the wheel-side mounting point P4 towards the back in the vehicle forward-backward direction with respect to the vehicle-body side mounting point P3 in the rear lower link 5. In addition, in the embodiment shown in FIG. 1, in top view, the tilting of the link axial line L1 of the front lower link 4 towards the back in the vehicle forward-backward direction is larger than the tilting of the link axial line L2 of the rear lower link 5 towards the back in the vehicle forward-backward direction. Due to such a disposition, in top view, the shape defined by connecting four points, that is, the wheel-side mounting points P2 and P4 and the vehicle-body side mounting points P1 and P3 of the respective lower links 4 and 5, is substantially trapezoidal.

Accordingly, as a result of setting the offset amount of the wheel-side mounting point P2 of the front lower link 4 with respect to the vehicle-body side mounting point P1 of the front lower link 4 towards the back in the vehicle forward-backward direction greater than the offset amount of the wheel-side mounting point P4 of the rear lower link 5 with respect to the vehicle-body side mounting point P3 of the rear lower link 5 towards the back in the vehicle forward-backward direction, the intersection P5 of the link axial lines L1 and L2 of the respective lower links 4 and 5 is, in top view, disposed behind a center of the wheel 1 (wheel center W/C) in the vehicle front-backward direction.

The elastic bushes 20 and 21, which constitute the linking portions that swingably link the front lower link 4 and the projecting portion 7 to each other, are called "connect bushes 20 and 21." The elastic bushes 9 to 12, which link the lower links 4 and 5 to the axle 2 and the suspension member 3, are called "mounting bushes 9 to 12."

Figure 3A:
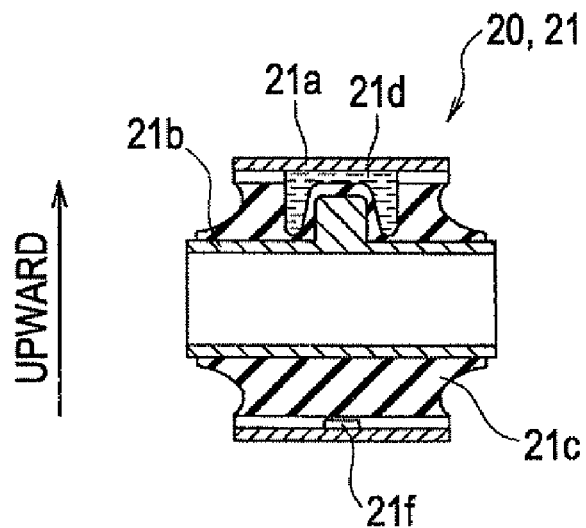
FIGS. 3A and 3B illustrate an exemplary structure of connect bushes.
Figure 3B:
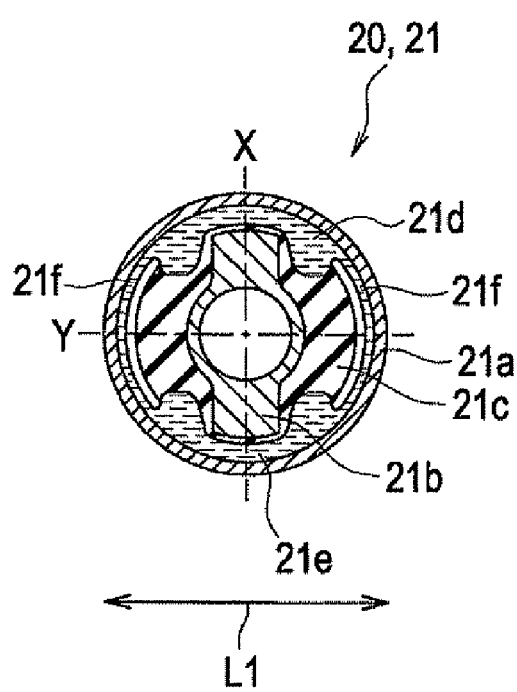

At least one of the connect bushes 20 and 21 is a fluid-inclusion bush such as that shown in FIGS. 3A and 3B. That is, the bush is formed by interposing an elastic member 21c and two liquid chambers 21d and 21e between an outer cylinder 21a and an inner cylinder 21b, filling the liquid chambers 21d and 21e with a liquid or a fluid (such as a magnetic fluid), and forming an orifice 21f connecting the two liquid chambers 21d and 21e and extending in a circumferential direction. The axes of the connect bushes 20 and 21 are set perpendicularly to the link axial line L1 of the front lower link 4, that is, in substantially the vehicle forward-backward direction as mentioned above.

Here, when only one of the connect bushes 20 and 21 is such a fluid inclusion bush, it is desirable that the wheel-side connect bush 20 be the fluid inclusion bush. This is because an amount of swinging displacement of the wheel-side connect bush 20 is large.

In addition, a resonance peak of the liquid of in the fluid inclusion bush is set at a forward-backward resonance frequency of the suspension and in the vicinity thereof. Accordingly, the fluid inclusion bush becomes an elastic bush having high damping characteristics at the forward-backward resonance frequency of the suspension and in the vicinity thereof.

Here, the liquid resonance occurs due to a resonance phenomenon when the fluid reciprocates in the orifice 21f.

Since the forward-backward resonance frequency of the suspension is determined by, for example, members of the suspension and a layout thereof it can be previously determined.

With a conventional suspension, an unbalanced exciting force resulting from a tire or a wheel 1 imbalance is transmitted to the suspension through the axle 2. In addition, at a predetermined vehicle speed, the frequency of this unbalanced exciting force matches the forward-backward resonance frequency of the suspension. This causes the vibration of the suspension to be large, and the vibration is transmitted to a vehicle body through the suspension members, causing the vehicle body to vibrate.

In contrast, in the embodiment, the suspension vibrates, but the two lower links 4 and 5 vibrate separately so that the connect bushes 20 and 21 linking the two lower links 4 and 5 absorb the vibration of the suspension as a result of repeatedly being deformed from swinging vertically and horizontally (horizontally here means in the vehicle width direction, which is substantially in the direction of the link axial line L1 of the front lower link 4). This causes the vibration of the suspension to be reduced. In particular, when the frequency of the unbalanced exciting force matches the forward-backward resonance frequency of the suspension, the vibration of the suspension is absorbed due to resonance occurring when the fluid in the fluid inclusion bush(es) reciprocates in the orifice 21*f*, thereby generating a high damping force. As a result, the vibration of the suspension is effectively restricted, so that the vibration of the vehicle body that is traveling is restricted.

Figure 4:
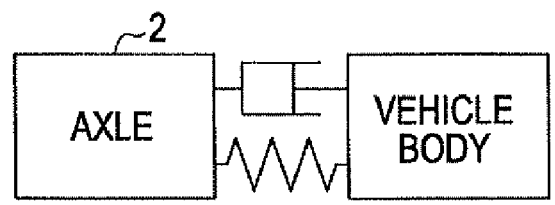
FIG. 4 shows a vibration model according to the embodiment of FIG. 1.
Figure 5:
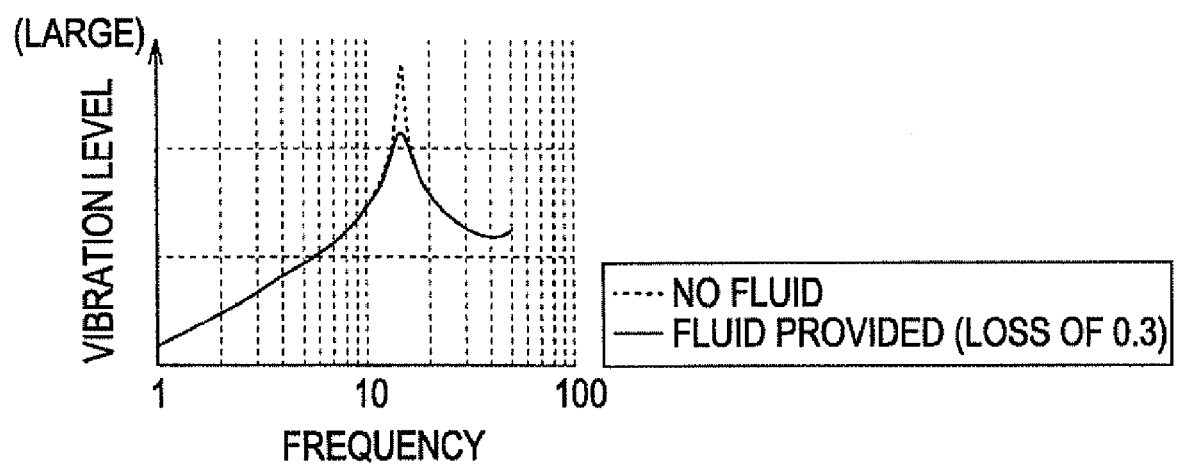
FIG. 5 is a graph showing a damping effect.

A vibration model according to the embodiment is illustrated in FIG. 4. The results confirmed by the inventor et al. are shown in FIG. 5. As shown in FIG. 5, it is understood that by setting a fluid resonance peak at the forward-backward resonance frequency of the suspension or in the vicinity thereof a vibration level is restricted from reaching the level illustrated by the broken line to the level illustrated by the solid line when the frequency of the unbalanced exciting force matches the forward-backward resonance frequency of the suspension.

In addition, the fluid inclusion bush can be such that fluid resonance occurs at a resonance frequency in a particular narrow range. Therefore, it is possible to reliably set a high damping characteristic with the forward-backward resonance frequency of the suspension and the frequencies in the vicinity thereof being resonance point targets.

Since the axes of the connect bushes 20, 21 are set perpendicular to the link axial line L1 of the front lower link 4, that is, the axes of the connect bushes 20, 21 are set substantially in the vehicle forward-backward direction, a fluid resistance due to the orifice 21*f* extending in the circumferential direction can be primarily provided when the bushes 20, 21 flex vertically and in the vehicle width direction. That is, when at least one of the connect bushes 20, 21 generates a damping force as a result of the fluid in the connect bush 20, 21 resonating effectively, it is possible to effectively restrict the vibration of the suspension as mentioned above.

When the two lower links 4 and 5 constituting the suspension vibrate by excitation of a wheel 1, a swinging behavior of the connect bushes 20 and 21 is such that the wheel-side connect bush 20 swings primarily vertically in response to twisting and primarily horizontally in response to shearing forces, thereby absorbing the vibration.

Linking the two lower links 4 and 5 to each other makes it possible for an input to the wheel 1 in the vehicle forward-backward direction to be received by the two lower links 4 and 5. Therefore, it is not necessary to provide a different link for receiving the input in the vehicle forward-backward direction.

The two lower links 4 and 5 are linked to each other, but can only swing within a predetermined range because the connect bushes 20 and 21 prevent swinging beyond the predetermined swinging range in at least the vehicle width direction with respect to the input to the wheels 1 in the vehicle forward-backward direction.

Figure 6:
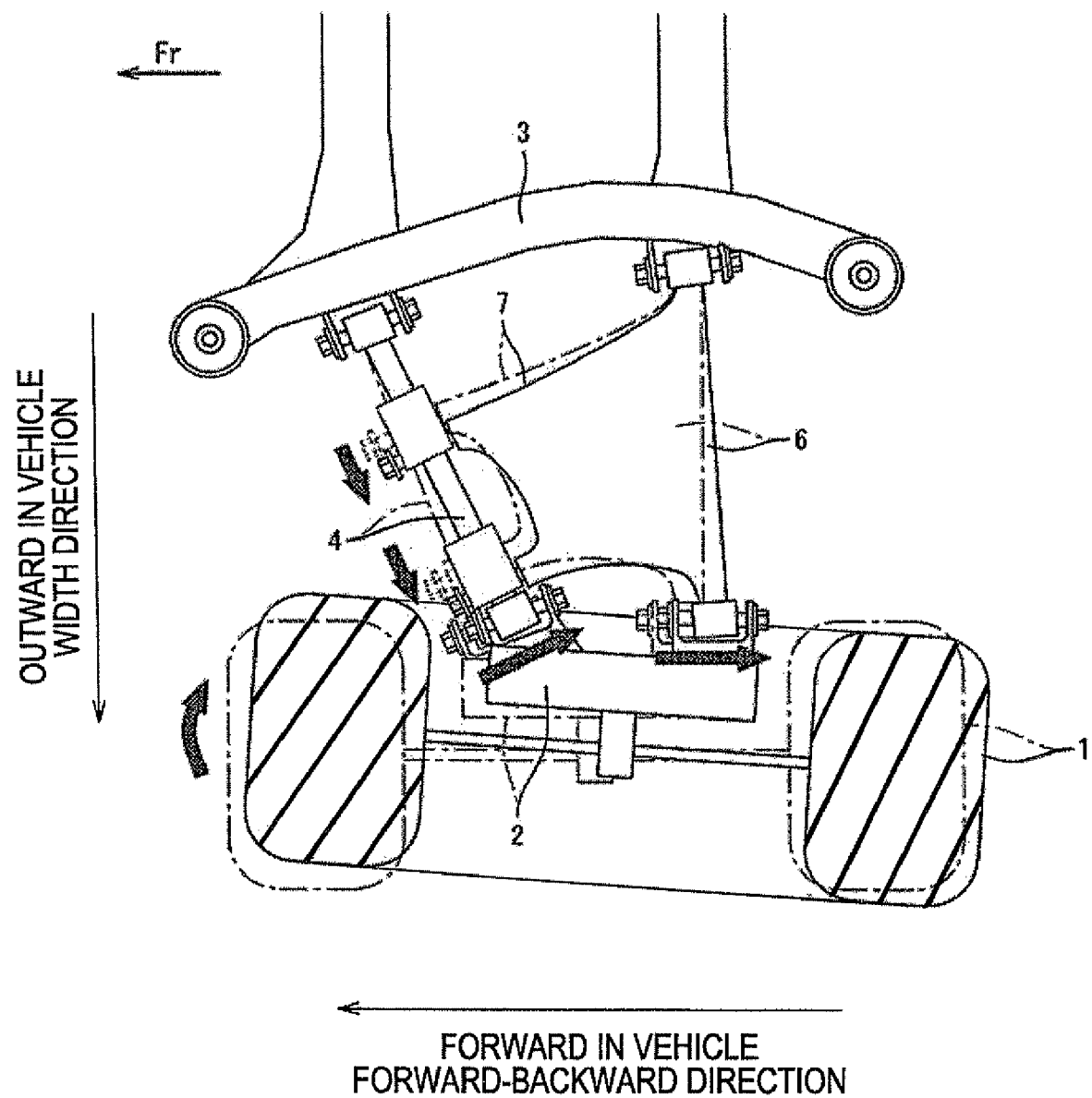
FIG. 6 is a top view of a behavior with respect to an input in a vehicle forward-backward direction.

The elastic members of the connect bushes 20 and 21 (linking portions) flex with respect to the input to the wheel 1 in the forward-backward direction (forward-backward input to the wheel center W/C) due to an irregular road surface so that, as shown in FIG. 6, the inner cylinders of the connect bushes 20 and 21 are swung and displaced in the vehicle width direction while being swung slightly in the vehicle forward-backward direction relative to the outer cylinders of the connect bushes 20 and 21. This causes the substantially trapezoidal shape in which the four points (that is, the wheel-side mounting points P2 and P4 of the respective two lower links 4 and 5 and the vehicle-body side mounting points P1 and P3 of the respective two lower links 4 and 5) are connected to be changed as seen in the top view so that the rigidity in the vehicle forward-backward direction of the axle 2 supported at the two linked lower links 4 and 5 is set low. Therefore, shock when moving over a protrusion is reduced, thereby improving ride quality.

In addition, the connect bushes 20 and 21 flex with respect to the forward-backward direction input to absorb the input, thereby resulting in damping due to the characteristics of the rubber making up the connect bushes 20 and 21. Therefore, vibration with respect to the input in the forward-backward direction subsides properly.

If the rigidity of the connect bushes 20 and 21 is set so that it becomes low with respect to a low-frequency-region input, such as when a vehicle travels over a protrusion, the connect bushes 20 and 21 swing vertically and horizontally (horizontally meaning in the vehicle width direction, which is substantially the direction of the link axial line L1 of the front lower link 4) to absorb the vibration. As a result, the vibration with respect to the input to the wheel 1 in the forward-backward direction (forward-backward input to the wheel center W/C) at a low frequency subsides properly, so that shock when traveling over a protrusion is reduced as mentioned above.

Accordingly, even if the lower links 4 and 5 are designed so as to satisfy strength requirements, the rigidity in the forward-backward direction is determined by the rigidity of the connect bushes 20 and 21 so that the degree of design freedom can be increased.

The rigidity with respect to the input in the forward-backward direction can be set low as a result of the connect bushes 20 and 21 flexing with respect to the forward-backward direction input to the wheels 1. Therefore, even if the two lower links 4 and 5 are linked to each other and are made to receive the forward-backward direction input to the wheel 1 for reducing shock resulting from an irregular road surface, the rigidity of the mounting bushes 9 to 12 (defining the wheel-side mounting points P2 and P4 of the respective two lower links 4 and 5 and the vehicle-body side mounting points P1 and P3 of the respective two lower links 4 and 5) need not be set low. Therefore, the rigidity of the mounting bushes 9 to 12 of the lower links 4 and 5 can be set high. With the rigidity of the mounting bushes 9 to 12 set high, horizontal rigidity (that is, rigidity in the vehicle width direction) of the axle 2 can be made high. In addition, this results in increasing the rigidity of a camber, so that steering stability can be increased. Since the horizontal input to the wheel 1 is applied to the two lower links 4 and 5 in substantially the directions of the link axial lines L1 and L2, even if the rigidity of the connect bushes 20 and 21 is set low, the horizontal rigidity of the axle 2 is not set low. As a result, the rigidity in the forward-backward direction can be set low and the horizontal rigidity can be set high, so that the ride quality can be improved and the steering stability can be increased.

In top view, the intersection P5 of the link axial lines L1 and L2 of the respective two lower links 4 and 5 is positioned behind the center of the wheel 1 (wheel center W/C) in the vehicle forward-backward direction so that the rotational center of the axle 2 is positioned behind the wheel center W/C. Therefore, with respect to an input in a tire horizontal direction when the vehicle is turning, a torque that causes the turning outer wheel 1 to be oriented in a toe-in direction acts, so that the stability during the turning of the vehicle is increased.

In top view, since the intersection P5 of the link axial lines L1 and L2 of the respective two linked lower links 4 and 5 is set outward of the axle 2 in the vehicle width direction, that is, since the span between the wheel-side mounting points P2 and P4 is set narrower than the span between the vehicle-body side mounting points P1 and P3 in the vehicle forward-backward direction, several advantages are provided.

First, when an input in the backward direction in the vehicle forward-backward direction is made to the ground-contact face of the wheel 1 due to, for example, braking, the wheel-side mounting points P2 and P4 of the respective two lower links 4 and 5 are both swung and displaced by substantially the same amount towards the back in the vehicle forward-backward direction. The difference between the displacements of the wheel-side mounting points P2 and P4 of the respective two lower links 4 and 5 in the horizontal direction of the vehicle causes a change in toe to a toe-in direction, so that stability is increased during the braking.

Further, in the embodiment shown in FIG. 1, the link axial line L2 of the rear lower link 5 is set substantially in the vehicle width direction. The link axial line L1 of the front lower link 4 is tilted towards the back in the vehicle forward-backward direction so that its wheel-side is set towards the back in the vehicle forward-backward direction. As a result, the wheel-side mounting points P2 and P4 of the respective two lower links 4 and 5 are swung and displaced by substantially the same amount towards the back in the vehicle forward-backward direction. The wheel-side mounting point P2 of the front lower link 4 is pulled further towards the vehicle than the wheel-side mounting point P4 of the rear lower link 5, so that the wheels 1 change to the toe-in direction.

Although a liquid inclusion bush is used for at least one of the connect bushes 20 and 21 in the embodiment to obtain a bush that exhibits the highest damping characteristic at the forward-backward resonance frequency of the suspension, the invention is not limited thereto. Similar effects can be obtained by using a rubber material that can exhibit the highest damping characteristic at least the forward-backward resonance frequency of the suspension and the vicinity thereof. When there are two or more high-damping frequency peaks due to the characteristics of, for example, the rubber material, one of them is set so as to become the forward-backward resonance frequency of the suspension.

Figure 7:
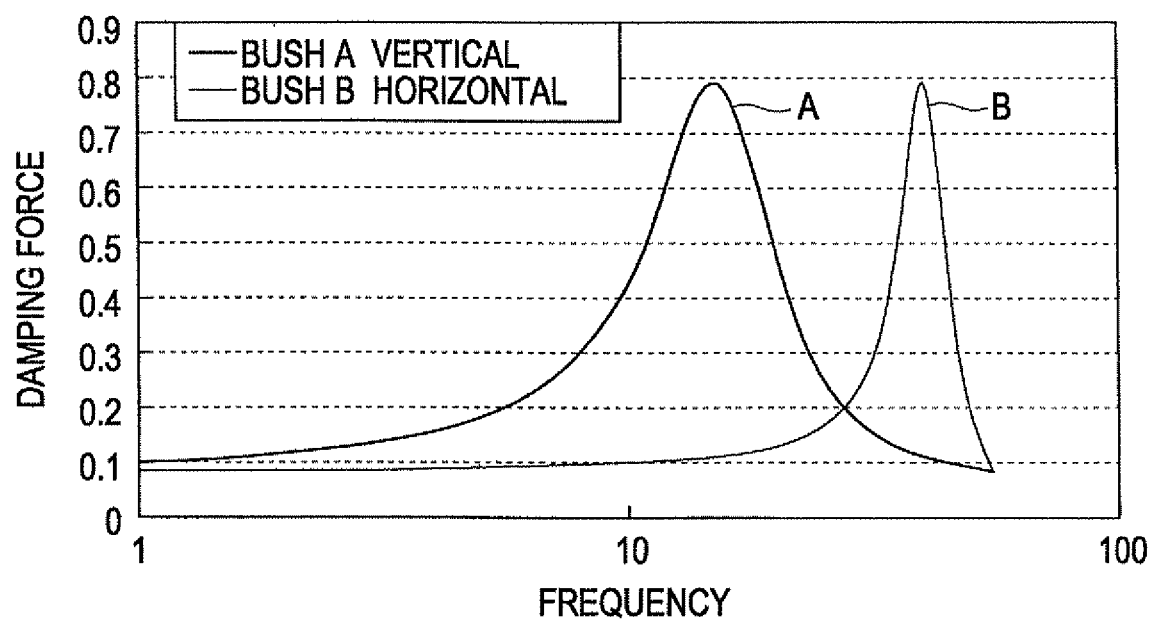
FIG. 7 is a graph of more exemplary damping characteristics of the connect bushes.

Although the fluid resonance peaks of the two connect bushes 20, 21 are set at the same suspension forward-backward resonance frequency and vicinity thereof, the invention is not limited thereto. Namely, the fluid resonance peaks of the respective bushes may be different frequencies. For example, the fluid resonance resulting from vertical flexing of one of the connect bushes 20 or 21 may be set at the suspension forward-backward resonance frequency and at the vicinity thereof so that damping characteristics such as those shown in FIG. 7 are provided. In addition, the fluid resonance peak resulting from flexing of the other connect bush 20 or 21 in the vehicle forward-backward direction is set at a peak value of vibration propagating due to a forward-backward twisting mode of a tire and at the vicinity thereof.

Figure 8:
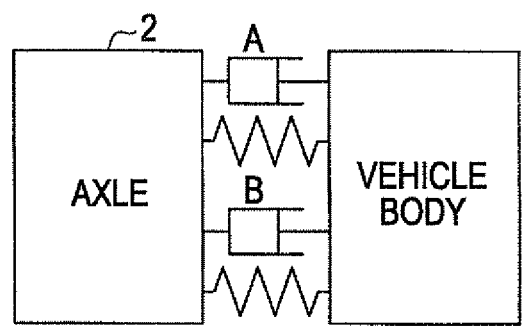
FIG. 8 shows another vibration model.
Figure 9:
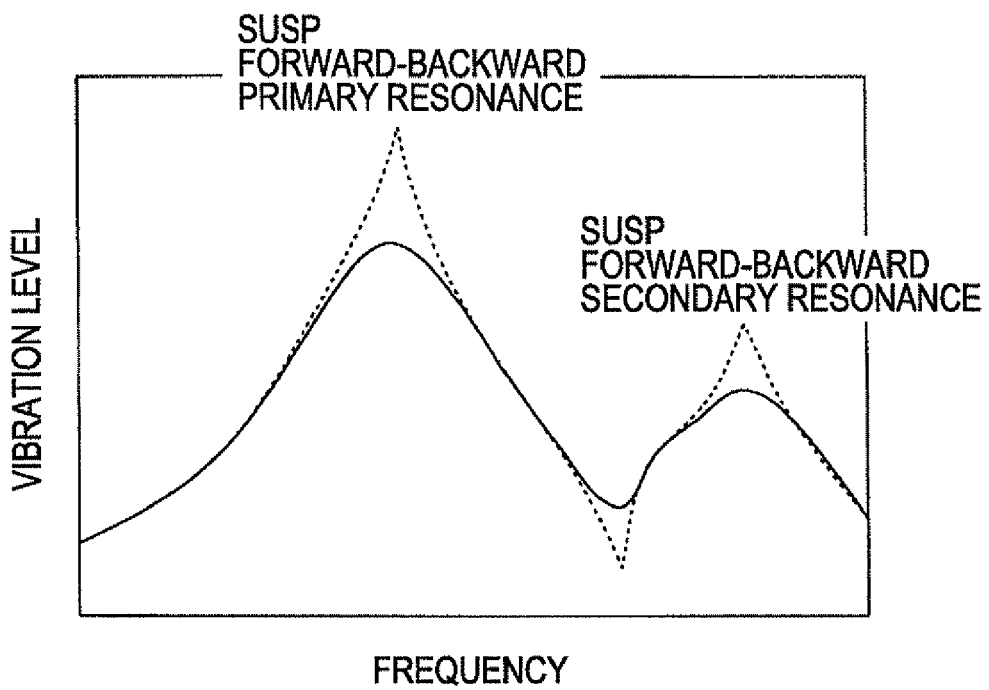
FIG. 9 is a graph showing a damping effect.

In this case, a vibration model such as that shown in FIG. 8 is provided. Therefore, as shown in FIG. 9, it is possible to reduce vibration caused by resonance of the suspension resulting from a forward-backward twisting mode of a tire, in addition to reducing vibration caused by resonance of the suspension resulting from an unbalanced exciting force of, for example, a tire.

Although the upper link 8 as shown comprises one rod link, it may comprise two or more rod links, or may be one link having a different form, such as an A arm.

Figure 11:
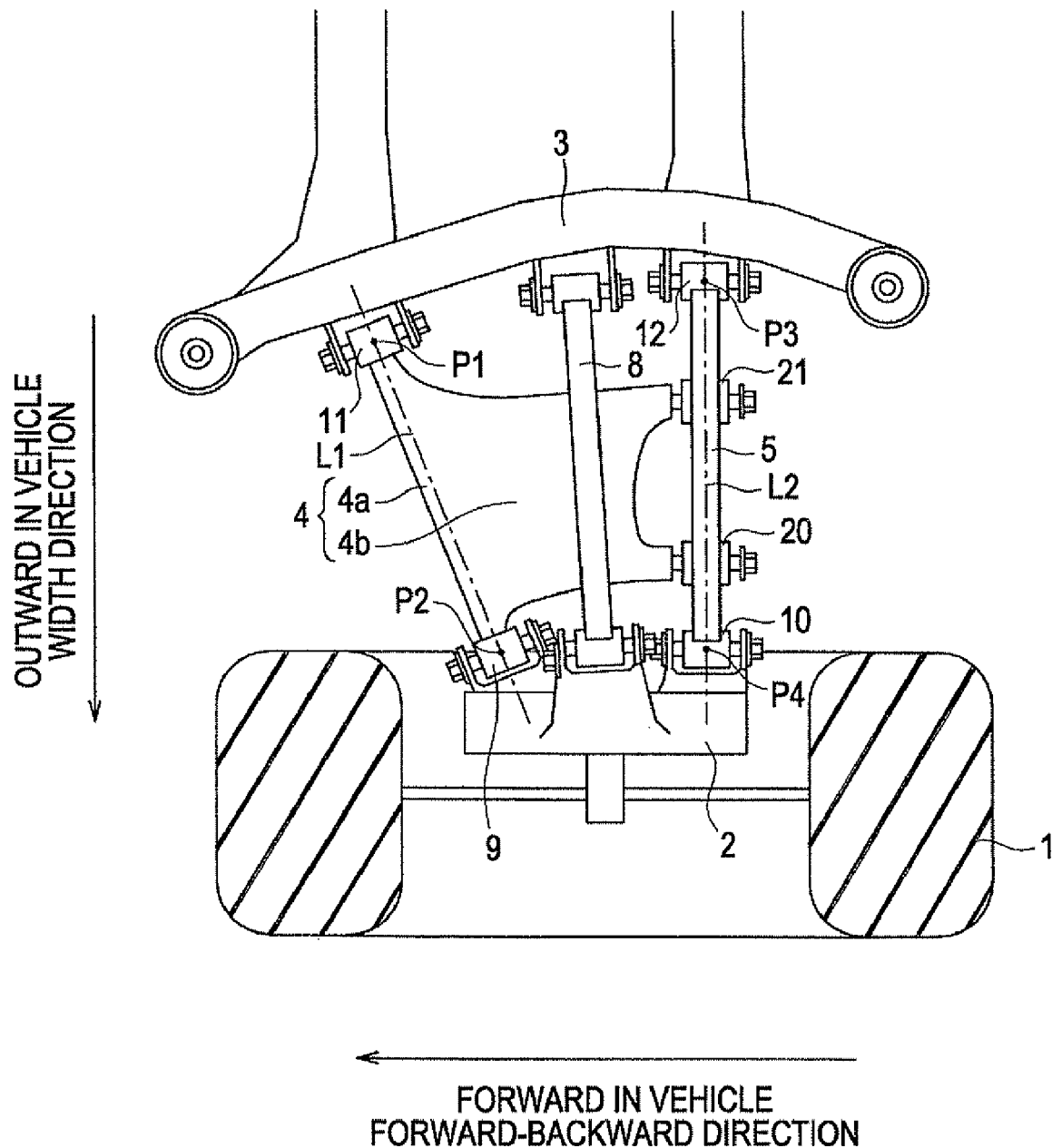
FIG. 11 is a top view of a suspension device for vehicle wheels according to a variation in embodiments of the invention.

In addition, as shown in FIG. 11, both of the lower links 4 and 5 may be linked to each other at a link axial line L2 side of the rear lower link 5 through the connect bushes 20 and 21. In this case, the lower link 4 includes a link body 4a and a projecting portion 4b. The link body 4a extends along the link axial line L1. The projecting portion 4b is integrated with the link body 4a and projects towards the rear in the vehicle forward-backward direction, from the link body 4a towards the rear lower link 5. The rear lower link is a rod member extending linearly along the link axial line L2.

Further, the connect bushes 20 and 21 linking the two lower links 4 and 5 need not be disposed on either of the link axial lines L1 and L2 of the respective lower links 4 and 5. For example, they may be disposed at intermediate positions between the two lower links 4 and 5.

In addition, it is possible to project projecting portions 7 separately from the lower link 4 to the lower link 5 and from the lower link 5 to the lower link 4, set one linking portion each on the axial lines of the lower links 4 and 5, and dispose the connect bushes 20 and 21 on these linking portions, respectively.

Even in this case, as viewed from the front of a vehicle, the two connect bushes 20, 21 can be disposed in an offset manner in the vehicle width direction. When only one connect bush 20 or 21 is used, the bush 20 or 21 can have a large size in order to have a very high rigidity at frequencies in the road noise region.

The number of connect bushes 20, 21 linking the two lower links 4 and 5 to each other is not limited to two, so that three or more bushes may be used, or one large bush can be used as described above.

In the above-described embodiment, the link axial line L2 of the rear lower link 5 is disposed in the vehicle width direction, and the link axial line L1 of the front lower link 4 is tilted towards the back in the vehicle forward-backward direction to set the intersection P5 of the link axial lines L1 and L2 of the respective two lower links 4 and 5 further outward than the axle 2 in the vehicle width direction. However, the invention is not limited thereto. For example, it is possible to dispose the link axial line L1 of the front lower link 4 in substantially the vehicle width direction and to tilt the link axial line L2 of the rear lower link 5 in the forward direction so that the wheel-side mounting point P4 is disposed more towards the front in the vehicle forward-backward direction than the vehicle-body side mounting point P3. With this arrangement, the intersection P5 of the link axial lines L1 and L2 of the respective two lower links 4 and 5 is still further outward than the axle 2 in the vehicle width direction.

Although the axes of the connect bushes 20 and 21 are disposed so as to be oriented substantially in the vehicle forward-backward direction (that is, in a direction perpendicular to the link axial lines L1 and L2), the invention is not limited by this feature. The axes of the connect bushes 20 and 21 may be disposed, for example, in the vehicle width direction or along the link axial lines L1 and L2. However, when the axes of bushes 20, 21 are oriented in a direction perpendicular to the link axial lines L1, L2 or in the vehicle forward-backward direction, it is easier to adjust the rigidities of the bushes 20, 21 in the vertical direction and the horizontal direction.

Further, the span in the vehicle forward-backward direction between the mounting points P1 and P3 may be equal to the span between the mounting points P2 and P4, that is, the two lower links 4 and 5 may be set parallel to each other.

A second embodiment according to the invention differs from the first in that in this second embodiment, elastic bushes satisfying the following Formula (1) are used, where As is the static rigidity for at least one of the connect bushes 20 and 21, Ad is the dynamic rigidity for at least one of the connect bushes 20 and 21 at a high-frequency region at which road noise is generated, Bs is the static rigidity of the mounting bushes 9 to 12, and Bd is the dynamic rigidity of the mounting bushes 9 to 12 at the high-frequency region at which road noise is generated. When only one of the connect bushes 20 and 21 is made to satisfy Formula (1), it is desirable but not necessary that the elastic bush be used for the wheel-side connect bush that swings by a relatively large amount.

$$(As/Bs) < (Ad/Bd) \tag{1}$$

Figure 10:
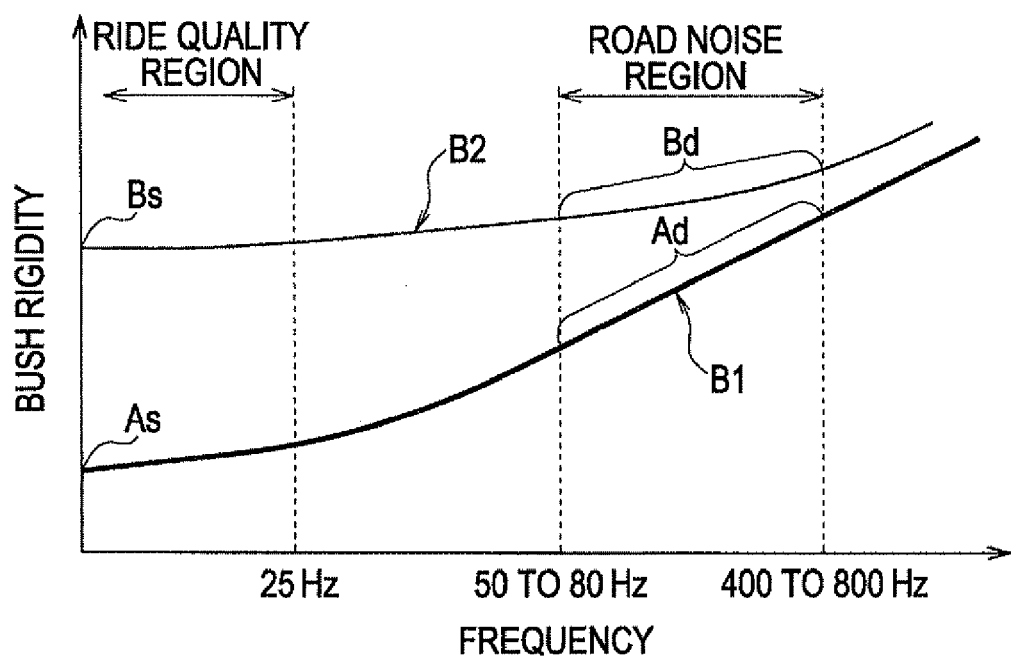
FIG. 10 is a graph showing exemplary rigidity characteristics of elastic bushes.

The bush rigidity characteristics are as shown in FIG. 10. For example, an elastic member having the following characteristics is used as at least one of the connect bushes 20 and 21. The rigidity of the connect bush 20, 21 is low with respect to an input at a low-frequency region in the range less than or equal to 25 Hz and for static rigidity, and the rigidity increases as the input frequency is increased. That is, the rigidity is soft with respect to the input at the low-frequency region and is hard with respect to an input at the high-frequency region as illustrated by characteristic B1 in FIG. 10.

The mounting bushes 9 to 12 use elastic bushes having the following characteristics. Namely, their rigidity is high with respect to an input at the low-frequency region (hereunder may also be referred to as "ride quality region") in the range less than or equal to 25 Hz and for static rigidity. The rigidity does not increase very much even if the input frequency is increased, so that the gradient thereof is lower than that of the rigidity of the connect bush. This is illustrated by characteristic B2 in FIG. 10.

If the rigidities are set in this way, Formula (1) is satisfied.

More specifically, to satisfy the condition of Formula (1), an elastic member in which, for example, carbon or mica is mixed in general rubber may be used for the connect bush 20, 21. In addition, the same material is used for the elastic members of the mounting bushes 9 to 12.

Here, in the high-frequency region (road noise region) where road noise is generated, even if the dynamic rigidity of the mounting bushes 9 to 12 is lower than the dynamic rigidity of the connect bushes 20 and 21, Formula (1) can be satisfied.

Road noise is noise that is generated by tires and a road surface when a vehicle is traveling. For example, when a tire vibrates minutely due to an uneven road surface, the vibration is transmitted to the vehicle body through the suspension, as a result of which this vibration becomes noise.

Though dependent upon the vehicle, in general, the lower limit of a frequency band of the high-frequency region (road noise region) is in the range of from 50 to 80 Hz, and the upper limit thereof is in the range of from 400 to 800 Hz. In general, a peak frequency band of the road noise is in the range of from 125 to 200 Hz.

With respect to an input at the ride quality region (low-frequency region) and for static rigidity, the mounting bushes 9 to 12 are hard (that is, have high rigidity), and the connect bushes 20 and 21 are soft (that is, have low rigidity). The rigidity difference between the bushes 20, 21 and 9 to 12 is set large. It is desirable that, in the road noise region (high-frequency region), the rigidity of the connect bushes 20 and 21 be higher.

Here, the axle 2 constitutes a wheel-side supporting member, and the suspension member 3 constitutes a vehicle-body side member.

Linking the two lower links 4 and 5 to each other makes it possible for an input to the wheel 1 in the vehicle forward-backward direction to be received by the two lower links 4 and 5. Therefore, it is not necessary to provide a different link for receiving the input in the vehicle forward-backward direction.

The two lower links 4 and 5 are linked to each other, but can only swing within a predetermined swinging range because the connect bushes 20 and 21 prevent swinging beyond the predetermined swinging range in at least the vehicle width direction with respect to an input to the wheels 1 in the vehicle forward-backward direction.

The elastic members of the connect bushes 20 and 21 (linking portions) flex with respect to the input to the wheel 1 in the forward-backward direction (forward-backward input to the wheel center W/C) due to an irregular road surface so that, as shown in FIG. 6, the inner cylinders in the connect bushes 20 and 21 are swung and displaced in the vehicle width direction while being swung slightly in the vehicle forward-backward direction relative to the outer cylinders. This causes the substantially trapezoidal shape in which the four points (that is, the wheel-side mounting points P2 and P4 and the vehicle-body side mounting points P1 and P3) are connected to be changed as seen in the top view, so that the rigidity in the vehicle forward-backward direction of the axle 2 supported at the two linked lower links 4 and 5 is set low. Therefore, shock when moving over a protrusion is reduced, thereby improving ride quality.

In addition, the connect bushes 20 and 21 flex with respect to the forward-backward direction input to absorb the input, thereby resulting in damping due to the characteristics of the rubber making up the connect bushes 20 and 21. Therefore, vibration with respect to the input in the forward-backward direction subsides properly.

By setting the rigidity of the connect bushes 20 and 21 low with respect to a low-frequency-region input, such as that when a vehicle travels over a protrusion, the connect bushes 20 and 21 swing vertically and horizontally (horizontal meaning in the vehicle width direction, which is substantially the direction of the link axial line L1 of the front lower link 4), to absorb the vibration. As a result, as mentioned above, the vibration with respect to the input to the wheel 1 in the forward-backward direction (forward-backward input to the wheel center at a low frequency) subsides properly, so that shock when traveling over a protrusion is reduced as mentioned above.

Regarding the swinging of the connect bushes 20 and 21 when a vehicle travels over a protrusion, the wheel-side connect bush 20 primarily swings vertically in response to twisting forces, and the connect bushes 20 and 21 primarily swing horizontally in response to shearing forces. This causes the vibration to be absorbed. Therefore, if Formula (1) is satisfied for at least the vertical rigidity and the horizontal rigidity (rigidity substantially in the vehicle width direction, i.e., the rigidity substantially in the direction of the link axial line L1 of the front lower link 4), several advantages can be provided.

First, even if the lower links 4 and 5 are designed so as to satisfy strength requirements, the rigidity in the forward-backward direction is determined by the rigidity of the connect bushes 20 and 21, so that the degree of design freedom can be increased.

Next, the rigidity with respect to the input in the forward-backward direction can be set low as a result of the connect bushes 20 and 21 flexing with respect to the forward-backward direction input to the wheel 1. Therefore, even though the two lower links 4 and 5 are linked to each other and are made to receive the forward-backward direction input to the wheel 1 to reduce shock resulting from an irregular road surface, the rigidity of the mounting bushes 9 to 12 (defining the wheel-side mounting points P2 and P4 and the vehicle-body side mounting points P1 and P3) need not be set low. In addition, the rigidity of the mounting bushes 9 to 12 of the lower links 4 and 5 is set high, so that the horizontal rigidity (that is, rigidity in the vehicle width direction) of the axle 2 can be made high. This results in increasing the rigidity of a camber, so that steering stability can be increased. Since the horizontal input to the wheel 1 is applied to the two lower links 4 and 5 in substantially the directions of the link axial lines L1 and L2, even if the rigidity of the connect bushes 20 and 21 is set low, the horizontal rigidity of the axle 2 is not set low. As a result, the rigidity in the forward-backward direction can be set low and the horizontal rigidity can be set high, so that the ride quality can be improved and the steering stability can be increased.

As mentioned above, the forward-backward rigidity of the suspension depends upon the rigidity of the connect bushes 20 and 21. With respect to an input of vibration at a high frequency in the road noise region (resulting from a relatively low force input caused by, for example, a tire pattern or a rough road surface), the rigidity of the connect bushes 20 and 21 is high. Therefore, by restricting independent swinging between the two lower links 5 when the input frequency is high, that is, by restricting a mode in which the lower links 4 and 5 move separately and roughly, the transmission force of the road noise is reduced, thereby restricting the road noise.

In top view, the intersection P5 of the link axial lines L1 and L2 of the respective two lower links 4 and 5 is positioned behind the center of the wheel 1 (wheel center W/C) in the vehicle forward-backward direction, so that the rotational center of the axle 2 is positioned behind the wheel center W/C. Therefore, with respect to an input in a tire horizontal direction (i.e., the vehicle width direction) when the vehicle is turning, a torque that causes the turning outer wheel 1 to be oriented in a toe-in direction acts so that the stability during the turning of the vehicle is increased.

Since the intersection P5 of the link axial lines L1 and L2 of the respective two linked lower links 4 and 5 is set outward of the axle 2 in the vehicle width direction, that is, since in the vehicle forward-backward direction, the span between the wheel-side mounting points P2 and P4 is set narrower than the span between the vehicle-body side mounting points P1 and P3, several advantages are provided.

First, when an input in the backward direction in the vehicle forward-backward direction is made to the ground-contact face of the wheel 1 due to, for example, braking, the wheel-side mounting points P2 and P4 of the respective two lower links 4 and 5 are both swung and displaced by substantially the same amount towards the back in the vehicle forward-backward direction. The difference between the displacements of the wheel-side mounting points P2 and P4 of the respective two lower links 4 and 5 in the horizontal direction (i.e., the vehicle width direction) of the vehicle causes a change in toe to a toe-in direction, so that stability is increased during the braking.

Further, in the embodiment shown in FIG. 1, the link axial line L2 at the rear lower link 5 is set substantially in the vehicle width direction. The link axial line L1 at the front lower link 4 is tilted towards the back in the vehicle forward-backward direction so that its wheel-side is set towards the back in the vehicle forward-backward direction. As a result, the wheel-side mounting points P2 and P4 of the respective two lower links 4 and 5 are swung and displaced by substantially the same amount towards the back in the vehicle forward-backward direction. The wheel-side mounting point P2 of the front lower link 4 is pulled further towards the vehicle than the wheel-side mounting point P4 of the rear lower link 5, so that the wheels 1 change to the toe-in direction.

Accordingly, it is possible to at least improve ride quality and increase steering stability, and to reduce vibration.

Although the upper link 8 comprises one rod link in the described embodiment, the upper link 8 may comprise two or more rod links, or may be one having a different form, such as an A arm.

In addition, as shown in FIG. 11 and as described above with respect to the first embodiment, both of the lower links 4 and 5 may be linked to each other at a link axial-line L2 side of the rear lower link 5 through the connect bushes 20 and 21.

Further, the connect bushes 20 and 21 linking the two lower links 4 and 5 need not be disposed on either of the link axial lines L1 and L2 of the respective lower links 4 and 5. For example, they may be disposed at intermediate positions between the two lower links 4 and 5.

It is also possible to project projecting portions 7 separately from the lower link 4 to the lower link 5 and from the lower link 5 to the lower link 4, set one linking portion each on the axial lines of the lower links 4 and 5, and dispose the connect bushes 20 and 21 on these linking portions, respectively.

As previously described, as viewed from the front of a vehicle, the two connect bushes 20, 21 are disposed in an offset manner in the vehicle width direction. Alternatively, when only one connect bush is used, the bush desirably has a large size in order to have a very high rigidity in the road noise region.

The number of connect bushes 20, 21 linking the two lower links 4 and 5 to each other is not limited to two, so that three or more bushes may be used, or one large bush can be used as described above.

Although the link axial line L2 of the rear lower link 5 is disposed in the vehicle width direction and the link axial line L1 of the front lower link 4 is tilted towards the back in the vehicle forward-backward direction to set the intersection P5 of the link axial lines L1 and L2 of the respective two lower links 4 and 5 further outward than the axle 2 in the vehicle width direction, the invention is not limited thereto. For example, it is possible to dispose the link axial line L1 of the front lower link 4 in substantially the vehicle width direction and to tilt the link axial line L2 of the rear lower link 5 in the forward direction so that the wheel-side mounting point 4 is disposed more towards the front in the vehicle forward-backward direction than the vehicle-body side mounting point P3. The intersection P5 of the link axial lines L1 and L2 of the respective two lower links 4 and 5 is still outward of the axle 2 in the vehicle width direction.

The axes of the connect bushes 20 and 21 are disposed so as to be oriented substantially in the vehicle forward-backward direction (that is, in a direction perpendicular to the link axial lines L1, L2) in this embodiment. However, the invention is not limited thereto. The axes of the connect bushes 20 and 21 may be disposed, for example, in the vehicle width direction or along the link axial lines L1 and L2. However, when the axes of bushes 20 and 21 are oriented in a direction perpendicular to the link axial lines L1 and L2 or in the vehicle forward-backward direction, it is easier to adjust the rigidities of the bushes 20 and 21 in the vertical direction and the horizontal direction.

Further, the span in the vehicle forward-backward direction between the mounting points P1 and P3 may be equal to the span between the mounting points P2 and P4, that is, the two lower links 4 and 5 may be set parallel to each other.

The basic structure of the third embodiment is similar to that of the second embodiment. Parts, etc., similar to those of the above-described embodiments are given the same reference numerals, and are not described in detail. The distinctive feature of the third embodiment is the structure of connect bushes 20 and 21.

In the embodiment, the connect bushes 20 and 21 are fluid-inclusion bushes, which are filled with magnetic fluid and are similar in structure to those shown in FIGS. 3A and 3B. Each of these bushes is formed by interposing an elastic member 21c and two liquid chambers 21d and 21e between an outer cylinder 21a and an inner cylinder 21b, by filling the liquid chambers 21d and 21e with the magnetic fluid, and by forming an orifice 21f extending in a circumferential direction. This makes it possible to change the bush rigidity, particularly in a bush axial direction, by changing the viscosity (resistance) of the magnetic fluid.

Further, a magnetic-force generating member (not shown) is set near the connect bushes 20 and 21. When the magnetic force generated by the magnetic-force generating member is received by the magnetic fluid, the viscosity of the magnetic fluid is changed, thereby changing the resistance of the fluid passing through the orifice.

Figure 12:
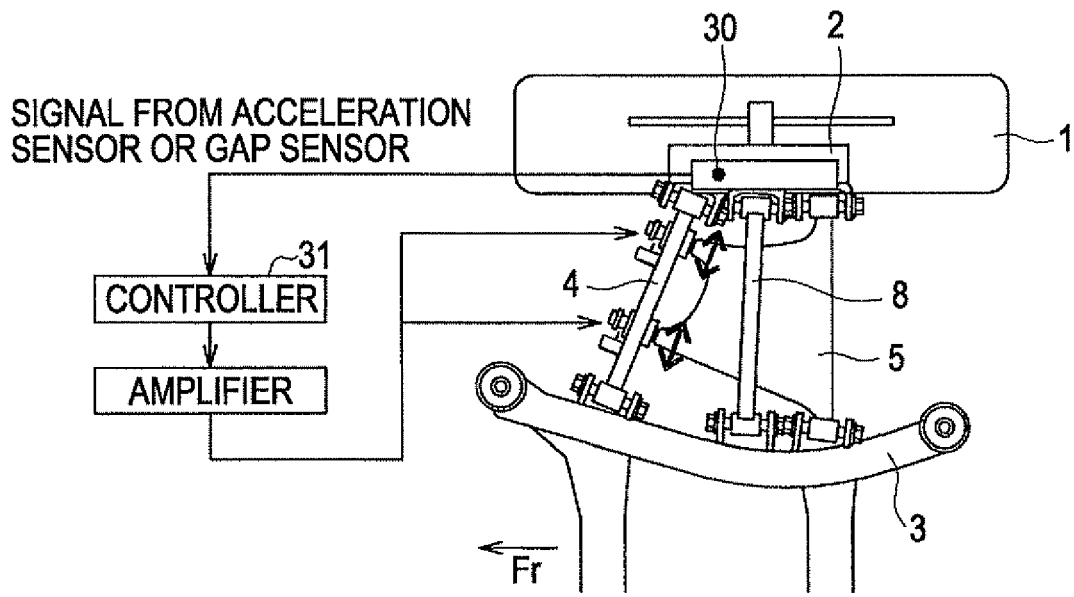
FIG. 12 is a top view of a suspension device for rear wheels according to a third embodiment of the invention.

A device that detects a vibration frequency that is generated at the suspension is provided. This device comprises, for example, an acceleration sensor or a velocity sensor mounted to the lower links 4 and 5 and the axle 2, or a gap sensor (relative displacement meter) mounted near the connect bushes 20 and 21. FIG. 12 shows an example in which a sensor 30, such as that mentioned above, is provided at the axle 2. The sensor 30 outputs a detection signal to a controller 31.

The controller 31 can be implemented by, for example, a microcomputer including a random access memory (RAM), a read-only memory (ROM) and a central processing unit (CPU) in addition to various input and output connections. Generally, the control functions described herein are performed by execution by the CPU of one or more software programs stored in ROM. Of course, some or all of the functions can be implemented by hardware components or a combination of hardware and software.

Figure 13:
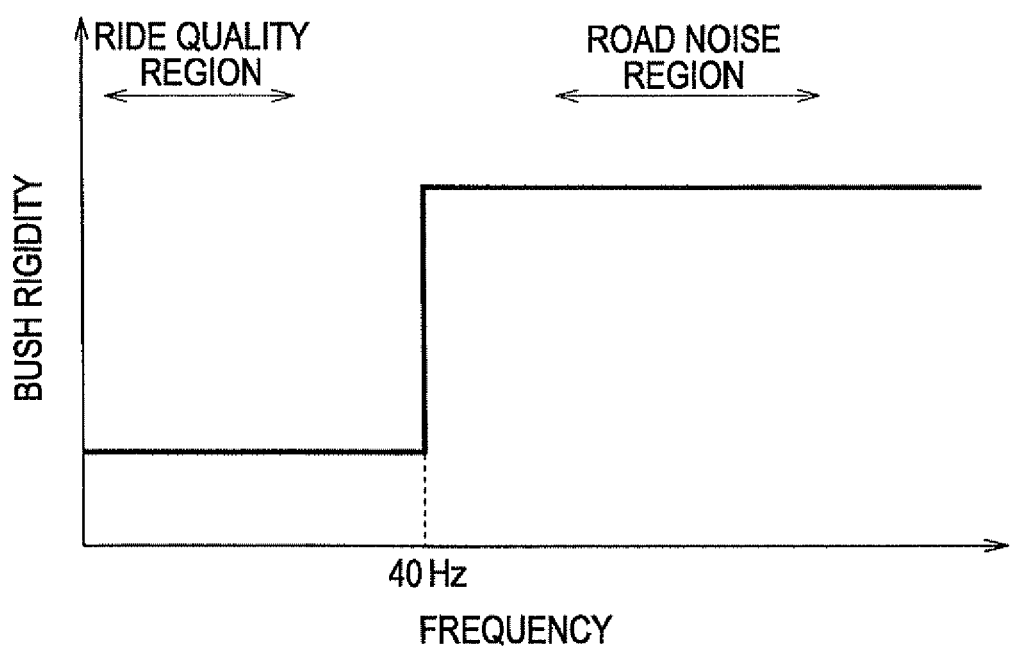
FIG. 13 is a graph showing an exemplary rigidity characteristic of an elastic bush.

The signal from the sensor 30 is input to the controller 31. Based on the signal, which communicates, for example, relative displacement information, acceleration information, and/or vibration velocity information, vibration frequency that is generated at the lower links 4 and 5 is calculated. If a determination is made that the frequency is greater than or equal to a predetermined frequency, such as a frequency of 40 Hz (which is slightly less than the high-frequency band of the road noise area), the magnetic force of the magnetic-force generating member (not shown) is changed to increase the viscosity of the magnetic fluid. This sets the rigidity of the connect bushes 20 and 21 to be high. Thus, the rigidity of the connect bushes 20 and 21 is dynamically switched as shown in FIG. 13 due to the vibration frequency generated at the suspension or a wheel.

The other structural features and the operational advantages of the third embodiment are similar to those of the second embodiment.

The above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A suspension device comprising:
    a wheel supporting member configured to rotatably supporting a wheel;
    two links respectively linking the wheel supporting member and a vehicle-body side member to each other and disposed substantially in parallel in a vehicle width direction;
    at least one projecting portion extending from at least one of the two links towards the other link; and
    at least one elastic linking portion linking the projecting portion of one of the links to the other link, the elastic linking portion configured to increase its rigidity with an increasing frequency of a vibration input over a target frequency band; and
    wherein the projecting portion links one of the links to the other link at two locations along a length of the other link using respective elastic linking portions.

2. The suspension device according to claim 1 wherein the target frequency band includes a frequency band at which road noise is generated.

3. The suspension device according to claim 1 wherein the target frequency band includes a suspension forward-backward resonance frequency.

4. The suspension device according to claim 1 wherein each elastic linking portion is a fluid inclusion bush comprising a first liquid chamber, a second liquid chamber and a communicating passage, the first liquid chamber and the second liquid chamber being filled with fluid and the communicating passage connecting the first liquid chamber and the second liquid chamber to each other; and
    wherein the target frequency band includes a resonance frequency of a fluid vibrating system comprising the first liquid chamber, the second liquid chamber and the communicating passage.

5. The suspension device according to claim 4 wherein the fluid inclusion bush is configured to generate the resonance frequency when the fluid inclusion bush flexes in at least one of a vehicle vertical direction and a vehicle width direction.

6. The suspension device according to claim 4 wherein each elastic linking portion has a different resonance frequency.

7. The suspension device according to claim 1, further comprising:
    link elastic members associated with each of the two links and engaged at respective linking portions where the two links are linked with the wheel supporting member and with the vehicle-body side member; and
    wherein a rigidity of the link elastic members is greater than the rigidity of the elastic linking portions.

8. The suspension device according to claim 1 wherein the two links include a first link and a second link, the suspension device further comprising:
    a first set of link elastic members at respective linking portions where the first link is linked with the wheel supporting member and with the vehicle-body side member; and
    a second set of link elastic members at respective linking portions where the second link is linked with the wheel supporting member and with the vehicle-body side member; and wherein the link elastic members and the elastic linking portions satisfy the following formula:

$$(As/Bs) < (Ad/Bd);\ \text{wherein}$$

Bs is a static rigidity of the link elastic members;

Bd is a dynamic rigidity of the link elastic members at each frequency of a frequency band at which road noise is generated;

As is a static rigidity of the elastic linking portions; and

Ad is a dynamic rigidity of the elastic linking portions at each frequency of the frequency band at which the road noise is generated.

9. The suspension device according to claim 1 wherein each elastic linking portion has a different resonance frequency.

10. The suspension device according to claim 9 wherein each elastic linking portion includes a fluid inclusion bush, each fluid inclusion bush comprising a first liquid chamber, a second liquid chamber and a communicating passage, the first liquid chamber and the second liquid chamber being filled with fluid and the communicating passage connecting the first liquid chamber and the second liquid chamber to each other; and wherein the target frequency band includes a resonance frequency of a fluid vibrating system comprising the first liquid chamber, the second liquid chamber and the communicating passage.

11. The suspension device according to claim 9 wherein the two links include a first link and a second link, the suspension device further comprising:

a first set of link elastic members at respective linking portions where the first link is linked with the wheel supporting member and with the vehicle-body side member; and a second set of link elastic members at respective linking portions where the second link is linked with the wheel supporting member and with the vehicle-body side member.

12. The suspension device according to claim 11 wherein a rigidity of each link of the first set of link elastic members and the second set of link elastic members is greater than a rigidity of each of the elastic linking portions.

13. The suspension device according to claim 11 wherein each link of the first set of link elastic members and the second set of link elastic members and each of the elastic linking portions satisfy the following formula:

$$(As/Bs) < (Ad/Bd);\ \text{wherein}$$

Bs is a static rigidity of each link elastic member;

Bd is a dynamic rigidity of each link elastic member at each frequency of a frequency band at which road noise is generated;

As is a static rigidity of each elastic linking portion; and

Ad is a dynamic rigidity of each elastic linking portion at each frequency of the frequency band at which the road noise is generated.

14. The suspension device according to claim 1 wherein the projecting portion is a plate member.

15. The suspension device according to claim 1 wherein the projecting portion is integral with a link of the two links that is located rearward with respect to the two links in a vehicle forward-backward direction.

\* \* \* \* \*